United States Patent [19]

Staerzl

[11] Patent Number: 4,617,892

[45] Date of Patent: Oct. 21, 1986

[54] FUEL-OPTIMIZING ELECTRONIC CONTROL CIRCUIT FOR A FUEL-INJECTED MARINE ENGINE OR THE LIKE

[75] Inventor: Richard E. Staerzl, Fond du Lac, Wis.

[73] Assignee: Brunswick Corporation, Skokie, Ill.

[21] Appl. No.: 676,217

[22] Filed: Nov. 29, 1984

Related U.S. Application Data

[63] Continuation of Ser. No. 622,386, Jun. 20, 1984, abandoned, which is a continuation of Ser. No. 327,166, Dec. 2, 1981, abandoned.

[51] Int. Cl.[4] ...................... G05D 13/62; F02D 41/00

[52] U.S. Cl. .................................... 123/352; 123/349; 123/350

[58] Field of Search ............... 123/352, 349, 350, 351, 123/437, 436, 353, 354; 180/179, 167, 176; 361/239

[56] References Cited

U.S. PATENT DOCUMENTS

| | | | |
|---|---|---|---|
| 4,044,234 | 8/1977 | Probenodus et al. | 123/436 |
| 4,064,846 | 12/1977 | Latsch et al. | 123/436 |
| 4,196,466 | 4/1980 | Noddings et al. | 123/352 |
| 4,196,787 | 4/1980 | Sakakibara et al. | 123/352 |
| 4,211,193 | 7/1980 | Cox et al. | 123/352 |
| 4,252,096 | 2/1981 | Kennedy | 123/349 |
| 4,273,208 | 6/1981 | Liermann | 123/352 |
| 4,351,281 | 9/1982 | Geiger et al. | 123/436 |
| 4,368,707 | 6/1983 | Leshner et al. | 123/436 |
| 4,402,376 | 9/1983 | Hayashi et al. | 123/350 |

OTHER PUBLICATIONS

Conference—"From Electronics to Microelectronics" . . . 4th European Conf. on Electrotechnics, 1980, Stuttgart, Germany.

*Primary Examiner*—Raymond A. Nelli

*Attorney, Agent, or Firm*—Hopgood, Calimafde, Kalil, Blaustein & Judlowe

[57] ABSTRACT

A self-adaptive fuel control system for an internal combustion engine which provides maximum fuel economy by maintaining engine operation at a preselected point on the r.p.m. vs. fuel flow curve. Engine operation is maintained at the preselected point by sampling initial steady state engine speed, leaning the fuel mixture supplied to the engine until there is a predetermined drop in engine speed, enriching the fuel mixture to attain an increase in engine speed, resampling engine speed and then repeating the process.

10 Claims, 8 Drawing Figures

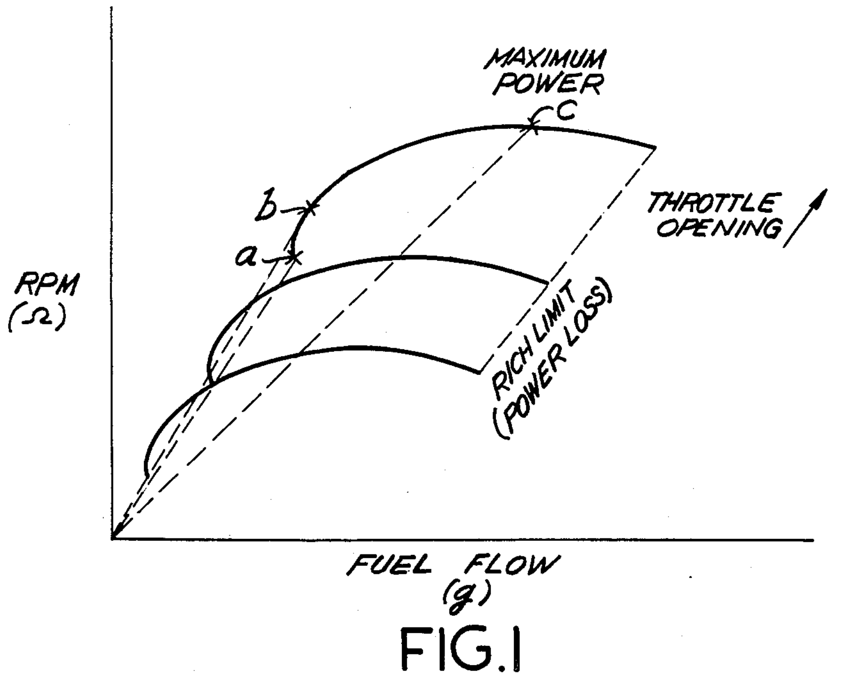
FIG. 1
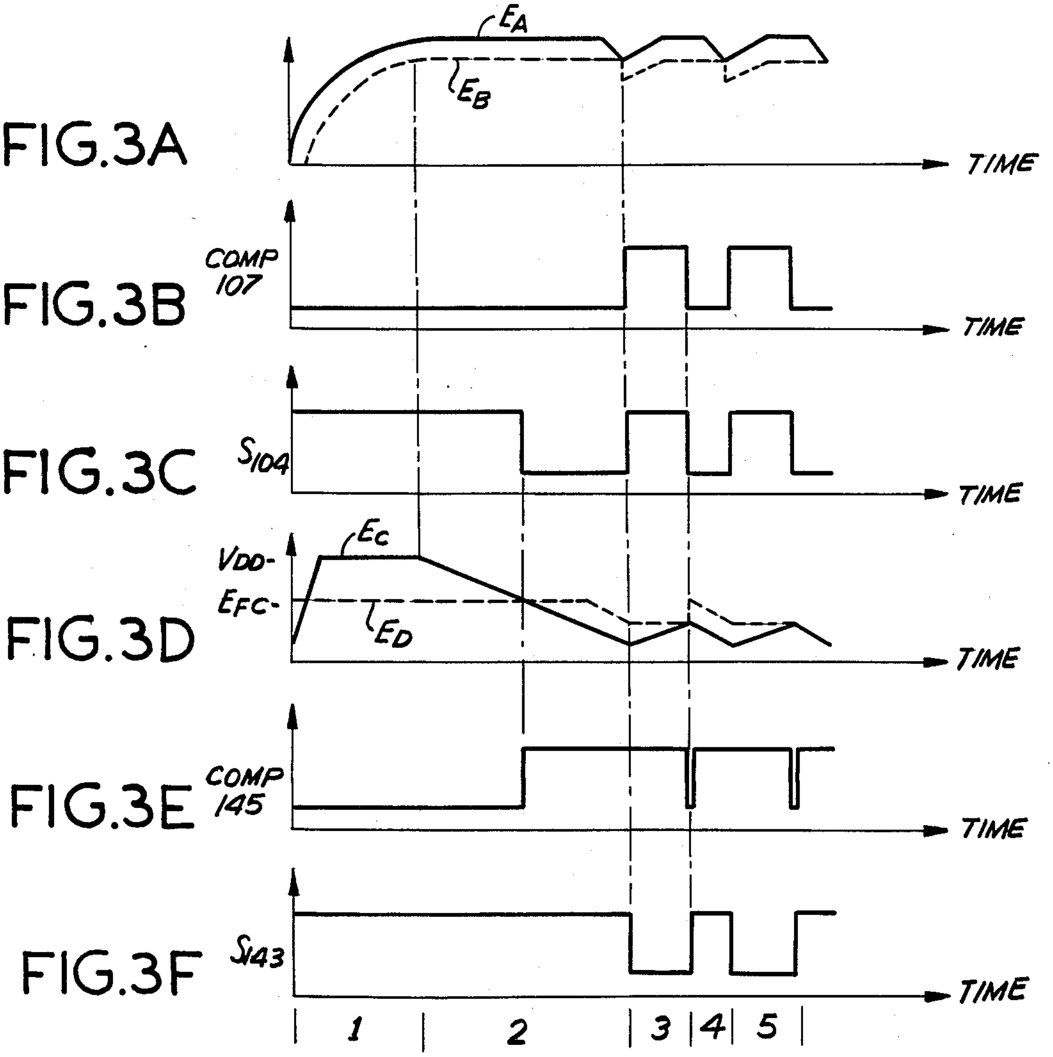
FIG. 3A
FIG. 3B
FIG. 3C
FIG. 3D
FIG. 3E
FIG. 3F

FUEL-OPTIMIZING ELECTRONIC CONTROL CIRCUIT FOR A FUEL-INJECTED MARINE ENGINE OR THE LIKE

This application is a continuation of application Ser. No. 622,386, filed 6-20-84, now abandoned, which is a continuation of Ser. No. 327,166, filed Dec. 2, 1981, now abandoned.

FIELD OF THE INVENTION

This invention relates to fuel control systems for internal combustion engines and more particularly to a self-adaptive fuel control system which provides maximum fuel economy for an internal combustion marine engine over all conditions of engine operation.

BACKGROUND OF THE INVENTION

Maximum fuel economy is now the primary goal for designers of internal combustion engines in view of the current and ever increasing cost of gasoline.

The customary practice in designing and calibrating the fuel supply systems for internal combustion engines is to pre-schedule fuel flow according to some function of engine operating condition as measured on the engine during operation. On carburetor type engines the principal measured function is usually venturi pressure, and the fuel flow is primarily determined by this pressure (or depression) and secondarily the fuel flow may be determined by measuring various engine functions such as r.p.m., manifold vacuum, air flows, throttle position, etc., and controlling the fuel flow in accordance with some predetermined schedule.

Fuel control systems of the type described above depend on prior knowledge of how the engine will perform under all possible conditions of load and environment. Such systems, even when relatively complicated and expensive, only obtain optimum performance in terms of fuel economy under a limited set of operating conditions.

It is therefore a general object of the present invention to provide a self-adaptive fuel control system that does not depend on prior knowledge of engine performance.

Self-adaptive fuel control systems per se are known and have been discussed by Draper and Li in a publication.* However, the Draper and Li system is designed to provide peak power output (maximum r.p.m.) for any given throttle setting and does not provide maximum fuel economy, as maximum fuel economy occurs near the border-line of lean misfire, not at maximum r.p.m.

*C. S. Draper and Y. T. Li, "Principles of Optimalizing Control Systems and the Application to the Internal Combustion Engine", American Society of Mechanical Engineers, 1951.

It is therefore a further object of the present invention to provide maximum fuel economy for any given throttle setting on an internal combustion engine.

A self-adaptive fuel control system that provides maximum fuel economy is described in a U.S. Patent Application entitled "Programmable Fuel Economy Optimizer For An Internal Combustion Engine" by H. E. Riordan, Ser. No. 305,900, filed Sept. 25, 1981 and assigned to the same assignee as is the instant invention. The Riordan fuel economy optimizer provides maximum fuel economy by determining a rate of speed change versus fuel flow rate change and senses the lean limit of the engine on the basis of deceleration rate. This approach, although providing many advantages not possible with prior art fuel control systems, is not compatible with all types of two-cycle engines.

It is therefore a further object of the instant invention to provide a self-adaptive fuel control system that operates with all engine types.

It is another object of the instant invention to provide a self-adaptive fuel control system that provides an exact range of fuel mixture variation.

It is a still further object of the instant invention to provide a self-adaptive fuel control system that has enhanced temperature stability.

SUMMARY OF THE INVENTION

In accordance with the invention an internal combustion engine is operated at or near a preselected point on the r.p.m. vs fuel flow curve, said preselected operating point providing maximum fuel economy during engine operation.

It is a feature of the invention that engine operation is maintained at or near the preselected operating point by sampling the fuel mixture and engine r.p.m. while at or near a steady state operating condition.

It is a further feature of the invention that the fuel mixture is leaned after the steady state operating condition is reached, allowing engine r.p.m. to decrease a first predetermined amount in reponse to the leaning operation.

It is a still further feature of the invention that when engine r.p.m. has decreased the first predetermined amount, the fuel mixture is enriched a second predetermined amount, said second predetermined amount being designedly less than the degree of lean-out from the steady-state operating condition, thereby allowing engine r.p.m. to again increase to a new steady-state operating condition.

The foregoing and other objects and features of this invention will be more fully understood from the following description of an illustrative embodiment thereof taken in conjunction with the accompaying drawings.

BRIEF DESCRIPTION OF THE DRAWINGS

In the drawings:

FIG. 1 illustrates typical r.p.m. vs fuel flow curves for an internal combustion engine;

DETAILED DESCRIPTION

Figure 2:
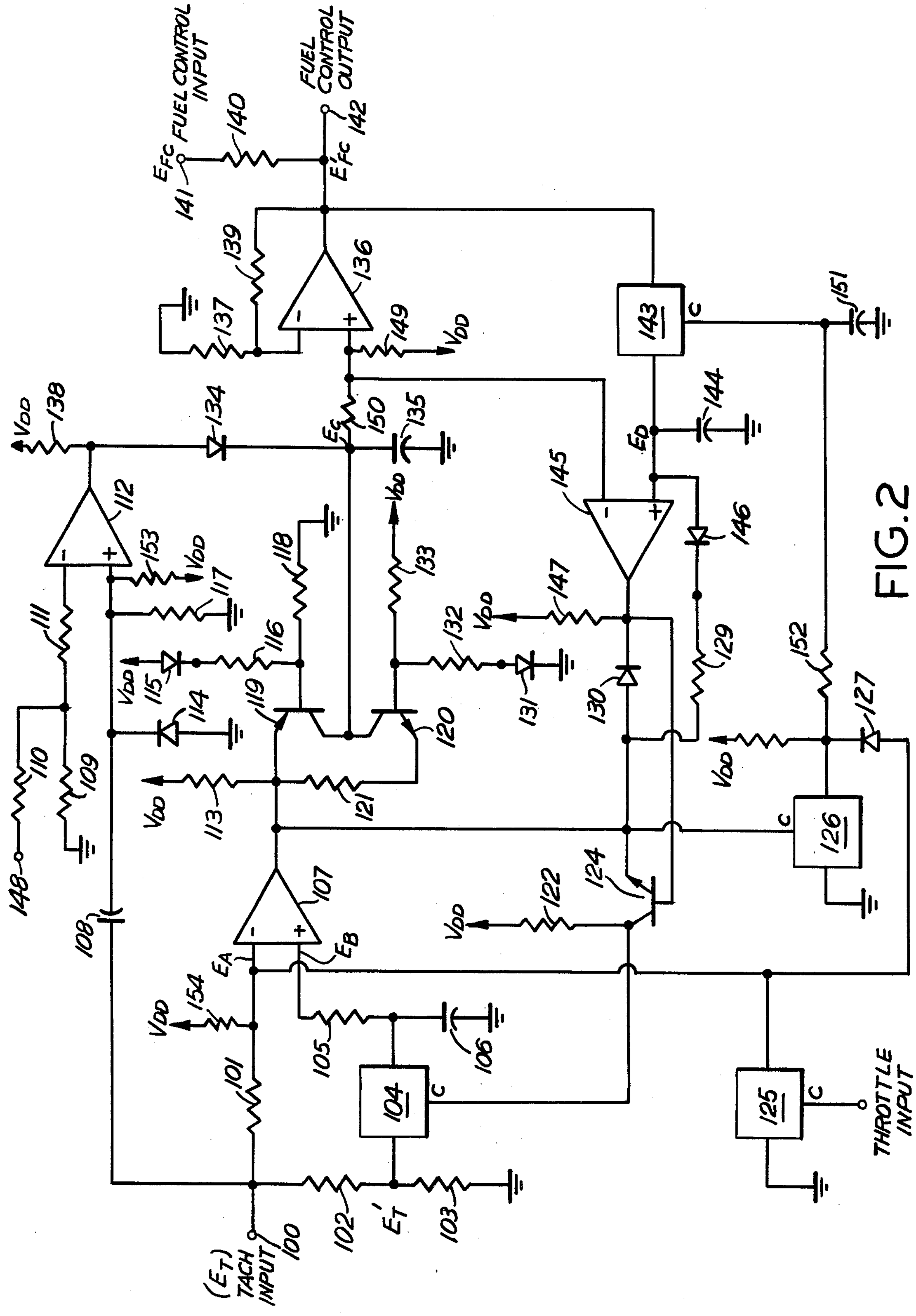
FIG. 2 is a schematic drawing of the circuitry of the instant invention which maintains engine operation at or near a preselected point, illustratively on one of the curves of FIG. 1; and FIGS. **3*A*–3*F* illustrate various waveforms present during operation of the circuitry of FIG. 2**.

It is known that for a given engine, operating with continuously connected load, the r.p.m. vs fuel flow curves will exhibit a relatively constant shape on the lean side of the curve for any given throttle setting. The fuel control system of the instant invention takes advantage of this phenomenon and maintains the fuel delivery rate consistently near the lean limit while avoiding misfire. Since maximum fuel economy occurs near the lean limit, the instant invention is able to achieve maximum fuel economy over all conditions of engine operation.

FIG. 1 shows a typical r.p.m. vs fuel flow curve for each of several settings of engine throttle opening. Points a, b and c on the top curve illustrate respectively the approximate conditions of over-lean fuel flow, maximum fuel economy, and maximum power. To the far right of each curve is the condition of fuel-rich limit, with resultant power loss. The fuel control system of the instant invention seeks to operate the associated internal combustion engine in a range slightly to the right of point b on the r.p.m. vs fuel-flow curve, where the slope of the curve is always positive but the offset from the lean limit and misfire is sufficient to provide smooth running. An operating range for the instant invention slightly to the right of point b provides maximum fuel economy yet is compatible with all engine types and enjoys great stability over a wide range of temperatures.

The fuel control system of the instant invention is shown in FIG. 2. The system provides optimum fuel economy by sampling the initial steady-state engine r.p.m., leaning the amount of fuel supplied until the engine r.p.m. drops by a predetermined amount, such as 50 r.p.m., enriching the fuel mixture by a predetermined amount, such as 3%, resampling the engine r.p.m. and then repeating the entire process. The essential functions of circuit operation are r.p.m. sampling and fuel-flow sampling with the circuit sensing the lean limit of engine operation on the basis of a finite r.p.m. loss.

Referring now in particular to FIG. 2, engine-r.p.m. information in the form of a tachometer signal is made available at terminal 100. The tachometer signal, is a d.c. level signal with a higher level d.c. signal indicating higher r.p.m. and a lower level d.c. signal indicating lower r.p.m. The tachometer signal is applied to comparators 107 and 112, to sample-and-hold circuit 104, and is also applied to terminal 148.

The fuel control signals (E'fc) utilized to supply fuel mixture control information to the associated internal combustion engine, are applied to the engine via terminal 142. These signals are modified versions of incoming fuel control signals Efc applied to the circuit of FIG. 2 via terminal 141. The incoming fuel control signals are d.c. level signals generated by a resistor network (not shown). The d.c. level of the incoming fuel control signals is modified by the output signals of operational amplifier 136 in a manner to be discussed below. The fuel control output signals, which are changing in d.c. level, are applied to pulse generation circuitry (not shown) which in turn controls fuel flow controlling devices (not shown) such as a fuel injection system or a carburetor with electrically controllable metering. It is to be understood during the following description that a decrease in the d.c. level of signals E'fc will result in a leaner fuel mixture being applied to the associated internal combustion engine while an increase in the d.c. level of signal E'fc will result in a richer fuel mixture being applied to the associated internal combustion engine.

The circuit of FIG. 2 is designed, for any throttle setting, to accommodate the condition of acceleration to an engine-r.p.m. level which maintains itself for a period of time. Once having achieved this "steady state" engine-r.p.m. level, the circuitry samples engine r.p.m. and fuel flow mixture to provide maximum fuel economy. Considering first the acceleration phase, assume that the associated internal combustion engine is accelerated to steady r.p.m., for a particular throttle setting. During acceleration, a high level d.c. tachometer signal is applied to the "+" terminal of comparator 112 via capacitor 108 and is also applied to terminal 148. Due to the bias network consisting of resistors 109, 110 and 111, the magnitude of the signal at the "+" terminal of comparator 112 exceeds the signal magnitude at the "−" terminal of comparator 112 resulting in a high level d.c. output signal from comparator 112. This high level signal level permits capacitor 135 to charge during the acceleration interval via diode 134.

The d.c. tachometer signal is also applied to the "−" input of comparator 107. Switch 104, as well as switches 125, 126 and 143, are standard CMOS sample-and-hold switches which are open (OFF) when the voltage at the C (control) input is less than approximately 3 volts and closed (ON) when the C input is greater than 6 volts. During acceleration, switch 104 is ON which applies the tachometer signal to the "+" input of comparator 107. The tachometer signal magnitude at the "−" input of comparator 107 is greater than the tachometer signal magnitude at the "+" input of comparator 107, due to the voltage divider network consisting of resistors 102, 103 and 105 and therefore the d.c. output signal level of comparator 107 is low during acceleration. The low signal level output of comparator 107 turns switch 126 OFF which in turn results in a high level voltage (VDD) being applied to the C terminal of switch 143, turning this switch ON, and applying the output signal from amplifier 136 to the "+" terminal of comparator 145 and also to capacitor 144, thus allowing this capacitor to charge as E'fc increases.

Due to the bias network consisting of resistors 137 and 139, the output of operational amplifier 136 tracks the voltage level at the amplifier's "+" input terminal and is slightly greater in magnitude than the voltage present on capacitor 135 (Ec). However the output of amplifier 136 is limited in value to the voltage present on terminal 141, i.e. the voltage level of the incoming fuel control signals Efc. During acceleration, the voltage across capacitor 135 (Ec) will increase until it exceeds Efc and at this time the output of comparator 145 will go low as the voltage magnitude at the "+" terminal of comparator 145 (Ec) exceeds the voltage magnitude at the "−" terminal of comparator 145 (Ed). The low output of amplifier 145 turns transistor 124 OFF which in turn places a high voltage level at the C terminal of sample and hold circuit 104.

As acceleration progresses, capacitor 106 begins to charge, from the high level output signal of sample and hold circuit 104. The charge being stored in capacitor 106 is indicative of engine r.p.m. as it is a sample of the tachometer signal E't.

At the conclusion of acceleration, a steady-state r.p.m. level is reached, with steady state r.p.m. being defined as that engine speed at which the d.c. level of the tachometer signal remains constant for a period of approximately 10 seconds. Upon reaching steady-state r.p.m., the tachometer signal applied to the "−" terminal of comparator 112 exceeds the magnitude of the tachometer signal being appled to the "+" terminal of comparator 112 through capacitor 108. When this occurs, the output of comparator 112 switches low and capacitor 135 begins to discharge through transistor 120, resistor 121 and the output of amplifier 107 which is low at this time.

As capacitor 135 continues to discharge, a point will be reached where the charge present across capacitor 144 (Ed) will exceed the charge present across capacitor 135 (Ec). When this occurs, the output of comparator 145 goes high, turning transistor 124 ON, which in turn places sample-and-hold switch 104 in the hold mode. Capacitor 106 at this point is charged to a value representative of a new level of engine steady-state r.p.m., speed and this value is retained since sample-and-hold circuit 104 has been placed in the hold mode.

Now that the engine has reached steady-state r.p.m., the fuel mixture will be leaned until engine r.p.m. drops a predetermined amount. During the leaning circuit operation, capacitor 135 continues to discharge, as described above, and the output of amplifier 136 (E'fc), which tracks the decline of the charge across capacitor 135 also declines in value. This declining signal is applied to terminal 142, and from there to the associated fuel control devices (not shown), to lean the fuel mixture applied to the associated internal combustion engine. As the fuel mixture becomes progressively leaner, engine r.p.m. begins to drop.

Recall from the previous description that when steady-state r.p.m. was reached, sample and hold circuit 104 was placed in the hold mode, maintaining a charge across capacitor 106 indicative of steady-state r.p.m. This voltage value (Eb) is applied to the "+" input of comparator 107. As engine r.p.m. decreases, the magnitude of the tachometer signal applied to the "−" terminal of comparator 107 (Ea) also decreases until it is less than the voltage value stored in capacitor 106 (Eb). The amount of decline in engine r.p.m. necessary to reach this point can be readily predetermined through proper selection of the value of resistors 101, 102, 103, and 154. An exemplary decline in engine r.p.m. for the embodiment of the invention described herein is 50 r.p.m.

At the time engine r.p.m. drops the predetermined amount, the output of comparator 107 will go high to commence enriching the engine fuel mixture. This high value output signal is applied to sample-and-hold circuit 126 which functions as an invertor and applies a low level signal to the control terminal of sample-and-hold circuit 143, placing this circuit in the hold mode. When this occurs, the last value of signal E'fc is stored in capacitor 144 (Ed) which represents the amount the internal combustion engine has been leaned since reaching steady state r.p.m., as described above.

The high level output of comparator 107 is also applied to transistor 119 and to transistor 124. The application of the high level signal to transistor 119 serves to commence charging capacitor 135 through transistor 119. As the voltage across capacitor 135 (Ec) increases, the output of the amplifier 136 experiences a corresponding increase. This increasing signal is applied to terminal 142, and to the associated fuel control devices (not shown), to begin enriching the fuel mixture applied to the associated internal combustion engine. As the fuel mixture is enriched, engine r.p.m. begins to increase. The application of the high level output signal from comparator 107 to transistor 124 turns this transistor OFF, which in turn places sample-and-hold circuit 104 back in the sample mode so that capacitor 106 can begin sampling the increasing engine r.p.m. in the manner previously described.

The fuel mixture will continue to be enriched and engine r.p.m. will continue to increase until the charge across capacitor 135 (Ec) exceeds the previously stored charge across capacitor 144 (Ed). The amount the fuel mixture is enriched is determined by the gain of amplifier 136 and is preferably 3%. The output of comparator 145 will go low when the mixture has been enriched 3% and initiate the next leaning cycle in the manner described above.

Referring now to FIGS. 3A–3F, it can be seen that the fuel control circuit of the instant invention progresses through a series of discrete intervals (1–5) which have been described in detail above. Interval 1 is the initial acceleration interval during which the internal combustion engine is advanced toward steady-state r.p.m., for the particular throttle setting. During this interval, the voltage across capacitor 135 (Ec) rises to the value of VDD (FIG. 3D) and then levels off.

Steady-state r.p.m. is reached in interval 2 at which time voltage Ec beings to decrease in the manner described above, which serves to lean the fuel mixture being applied to the internal combustion engine. When voltage Ec decreases below the level of the voltage across capacitor 144 (voltage Ed, FIG. 3D), the output of amplifier 145 goes high (FIG. 3E) and switch 104 is placed in the hold mode (FIG. 3C). Leaning the engine fuel mixture continues (FIG. 3D) until the engine r.p.m. drops a predetermined amount. The drop in engine r.p.m. is indicated in FIG. 3A when voltage Ea ("−" input of comparator 107) falls below voltage Eb ("−" input of comparator 107).

When engine r.p.m. drops the predetermined amount, the transition is made from interval 2 to interval 3. At this time, device 104 is placed in the sample mode (FIG. 3B), device 143 is placed in the hold mode (FIG. 3F), the output of comparator 107 goes high (FIG. 3B), and Ec beings to increase (FIG. 3D), which serves to enrich the fuel mixture and increase engine r.p.m.

Engine r.p.m. continues to increase until voltage Ec again reaches the value of voltage Ed at the boundary between intervals 3 and 4 (FIG. 3D). At this time, the output of comparator 107 goes low (FIG. 3B), device 104 returns to the hold mode (FIG. 3C,) the output of comparator 145 goes low (FIG. 3E), device 143 returns to the sample mode (FIG. 3F), and the voltage Ec begins to decrease (FIG. 3D), thereby initiating another leaning cycle as described above.

Interval 5 repeats interval 3 and this process of selective speed sampling and fuel-flow sampling will continue as long as the engine is maintained at the same throttle setting.

The circuit of FIG. 2 is designed for maximum fuel economy for any throttle setting within a large range of operating r.p.m.; however, it not intended to control the fuel mixture at idle or at very large throttle openings. More particularly, at idle, the tachometer signal applied to terminal 148 serves to hold the output of comparator 112 low, which disables the described automatic circuit operation. Similarly, at very large throttle openings (greater than 50%) device 125 is enabled, which in turn disables comparator 107 and serves to inhibit the lean cycle described above. The remaining components shown in FIG. 2, not specifically referred to during the foregoing description, are standard bias and divider networks and will not be discussed in detail as their function is clearly understood to one skilled in this technical area.

Although a specific embodiment of this invention has been shown and described, it will of course be understood that various modifications may be made without departing from the spirit of this invention.

I claim:

1. A fuel control system for providing maximum fuel economy over a wide range of engine throttle conditions of an internal combustion marine engine, comprising:
   - storage means for storing a fuel control signal whose magnitude is related to the operating r.p.m. of the internal combustion engine;
   - means for reducing the magnitude of said stored fuel control signal in response to achieving a steady state of the operating r.p.m. of the internal combustion engine;

fuel control means for controlling fuel flow to the internal combustion engine in response to the instantaneous reducing magnitude of said stored fuel control signal whereby the fuel/air ratio of the internal combustion engine is reduced as the magnitude of said stored fuel control signal is reduced;

first comparative means for comparing a steady state r.p.m.-representative signal representing said steady state operating r.p.m. of the internal combustion engine with an actual operating r.p.m. signal representing the reducing actual operating r.p.m. of the internal combustion engine; and means responsive to said first comparative means for causing an increase in said magnitude of said stored fuel control signal in said storage means when said actual operating-r.p.m. signal falls below said steady state r.p.m. signal by a predetermined amount.

2. The fuel control system of claim 1 wherein there is further provided first sample-and-hold means for sampling said actual operating-r.p.m. signal while the operating-r.p.m. of the internal combustion engine is increasing, and holding a value of said actual operating-r.p.m. signal while the stored fuel-control signal is reducing.

3. The fuel control system of claim 1 wherein there is further provided second comparative means for comparing said reducing magnitude of said stored fuel control signal against a fuel control signal value corresponding to fuel consumption at said steady-state operating r.p.m. of the internal combustion engine.

4. The fuel control system of claim 3 wherein there is further provided second sample-and-hold means for sampling said fuel control signal and holding said fuel control signal value.

5. The fuel control system of claim 1 wherein said predetermined amount by which said operating-r.p.m. signal falls below said steady state r.p.m.-representative signal corresponds to a reduction of approximately 50 r.p.m.

6. The fuel control system of claim 1 wherein said increase in said magnitude of said stored fuel control signal corresponds to an increase of approximately 3%.

7. A method of increasing fuel efficiency in the operation of a marine internal combustion engine, for a given one of a plurality of engine-throttle settings, the method comprising the steps of:

allowing the operating r.p.m. of the internal combustion engine to increase to a steady state value;

storing an r.p.m.-signal value corresponding to said steady state value;

fuel-leaning the air/fuel ratio of the internal combustion engine, whereby engine r.p.m. reduces from said steady-state value;

monitoring a decrease in said operating r.p.m. of the internal combustion engine with respect to said stored r.p.m.-signal value; and fuel-enriching said air/fuel ratio by a predetermined amount when said operating r.p.m. of the internal combustion engine has been reduced with respect to said stored r.p.m.-signal value by a predetermined amount.

8. The method of claim 7 wherein said predetermined amount by which the operating r.p.m. of the internal combustion engine is reduced with respect to said stored r.p.m.-signal value prior to performing said step of fuel enriching corresponds to a reduction in by approximately 50 r.p.m.

9. The method of claim 7 wherein said predetermined amount by which said air/fuel ratio is fuel-enriched corresponds to approximately 3%.

10. The method of claim 7 wherein said performing said step of fuel-enriching there is provided the further step of repeating said step of fuel-leaning.

* * * * *